Patented Oct. 5, 1943

2,331,032

UNITED STATES PATENT OFFICE 2,331,032

DENATURANTS

Hamline Monroe Kvalnes, Wilmington, Del., assignor to E. I. du Pont de Nemours & Company, Wilmington, Del., a corporation of Delaware No Drawing. Application January 2, 1943, Serial No. 471,211

11 Claims. (Cl. 252—366)

This invention relates to denaturants and more particularly to denatured alcohols and the method of denaturing them.

It is an object of the present invention to provide a new and improved denaturant and denatured materials. It is a further object of the present invention to provide a denatured ethyl alcohol which possesses a distinctive but unobjectionable odor, and a taste which renders the ethyl alcohol unpotable.

Other objects and advantages of the present invention will be apparent by reference to the following specification in which the preferred embodiments and details are set forth.

According to the present invention a denatured material from which it is extremely difficult if not impossible to remove the denaturant is prepared by mixing with a liquid material such as an alcohol, including methyl, ethyl and like alcohols, relatively small quantities of a mixture of aldehydes prepared by oxidizing a mixture of higher alcohols obtained in the high pressure synthesis of methanol from hydrogen and oxides of carbon. In one preferred embodiment, the denaturant comprises the oxidation product prepared by oxidizing a mixture of aliphatic branched-chain higher alcohols boiling within the range 108° C. to 200° C. and obtained in the high pressure synthesis of methanol from hydrogen and oxides of carbon, together with unoxidized higher aliphatic branched-chain alcohols boiling within the range 108° C. to 200° C. obtained in the high pressure synthesis of methanol and further admixed with a mixture of ketones and branched-chain alcohols and aldehydes extracted from the product obtained in the high pressure synthesis of methanol from hydrogen and carbon oxides as hereinafter more fully described.

In another specific preferred embodiment, the denaturant comprises denaturing quantities of a material selected from the group consisting of 2-methyl pentanal and 2,4-dimethyl pentanal, both of which are specific aldehydes prepared by the partial oxidation of the corresponding alcohols which in turn are obtained from the high pressure synthesis of methanol from hydrogen and oxides of carbon.

A wide range of alcohols may be successfully denatured or distinguished from one another according to this invention, such, for example, as methyl alcohol, ethyl alcohol, butyl alcohol, isobutyl alcohol, isopropyl alcohol and others.

The higher branched chain aliphatic alcohols from which the denaturant of the present invention is produced by partial oxidation are formed in the synthesis of methanol from hydrogen and oxides of carbon. When an oxide of carbon is subjected to catalytic hydrogenation at elevated temperatures and pressures, there results a mixture of methanol, primary and secondary alcohols of higher molecular weight, and the dehydrogenation and dehydration products of such higher alcohols as described in Lazier U. S. 1,746,782 and the following patents: 1,746,781; 1,746,783; 1,829,046; Larson 1,844,587; Storch 1,681,750; 1,681,752; 1,738,971, and Williams Reissue 18,302.

Among the alcohols, boiling above methanol, such as hereinbefore described, there have been identified normal propanol, isobutanol, pentanol-2, pentanol-3, 2-methyl pentanol-3, 2-methyl pentanol-4, 2,5-dimethyl hexanol-3, and 4-methyl pentanol-2, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1. There are present also numerous other primary and secondary alcohols containing from 5 to 14 carbon atoms.

The aforementioned alcohols are partially oxidized in the vapor phase to prepare the aldehydes useful for denaturants in accordance with the present invention. The resulting denaturant contains at least 5% by weight of aldehydes, the balance being ketones and unoxidized alcohols together with other unidentified products. The oxidation of the higher alcohols to the corresponding aldehydes can be carried out by passing the alcohol mixture in the vapor phase over a catalyst in the presence of air or other molecular oxygen containing gas as described in U. S. 1,067,665; 1,100,076; 1,110,289; 1,666,447; 1,937,381; 1,968,552; 2,005,645; 2,111,584; and especially U. S. 2,123,520.

In addition to the mixture of higher alcohols, higher aldehydes, ketones and the like prepared by the partial oxidation of higher alcohols of boiling range 108° C. to 200° C., it has been found that the admixture of a small proportion of the by-products of the methanol synthesis comprising dehydrogenation and dehydration products commonly known as "fore shots," results in a further and increased improvement in denaturing ability. When the mixture resulting from the catalytic pressure hydrogenation of carbon oxides is subjected to distillation, the mixture of methanol and dehydrogenation and dehydration products is separated from the higher boiling alcohols and the mixture of methanol and dehydrogenation and dehydration products are thereafter separable from each other by water scrubbing. It is this mixture remaining after separation of methanol therefrom which is commonly known as "fore shots" and which can desirably be admixed with the oxidation products of the higher alcohols containing a large amount of aldehydes, to improve the denaturing effect.

It has been previously proposed to utilize various pure aldehydes and mixtures of ketones as denaturing agents, but it has been found that the aldehyde denaturants prepared and employed in accordance with the present invention are unexpectedly more efficacious than the ketones and pure aldehydes heretofore proposed as denaturants.

The proportions of the denaturant used with alcohol may vary over a wide range, although, generally speaking, only small amounts are required, ethyl alcohol containing as little as 0.5% or even less being quite unpotable. At the same time, within certain limits, the larger the proportion of a denaturant the more distasteful the product and the more difficult the separation of denaturant therefrom. In general, from 0.1 to 10% by volume of the aldehyde mixture can be used with entire satisfaction to completely denature ethyl alcohol, and preferably, from 0.5 to 5.0% by volume is employed.

Two particular aldehydes known to be present in the crude vapor phase oxidation product are especially efficient as denaturants. They are 2-methyl pentanal and 2,4-dimethyl pentanal. These two aldehydes may be employed alone or together as denaturants, in proportions ranging from 0.1 to 10.0% by volume and preferably from 0.5 to 5.0% by volume of either one or a mixture of these two aldehydes.

For the purpose of illustration only and not by way of limitation, the following examples in which parts are by volume are given:

Example 1—A denatured alcohol was prepared by adding five parts of oxidized 150–160° C. alcohols to 100 parts of 95% ethyl alcohol. The 150 to 160° C. alcohols were obtained in the high pressure synthesis of methanol from hydrogen and carbon monoxide.

Example 2—A denatured alcohol was prepared by adding five parts of oxidized 130–150° C. alcohols to 100 parts of 95% ethanol. The 130–150° C. alcohols were obtained in the high pressure synthesis of methanol from hydrogen and carbon monoxide.

Example 3—A denatured alcohol was prepared by adding five parts of 2,4-dimethyl pentanal to 100 parts of 95% ethyl alcohol.

Example 4—A denatured alcohol was prepared by adding five parts of 2-methyl pentanal to 100 parts of 95% ethyl alcohol.

Example 5—A denatured alcohol was prepared by adding five parts of oxidized 130° to 200° C. alcohols to 100 parts of 95% ethyl alcohol. The 130° to 200° C. alcohols were obtained in the high pressure synthesis of methanol from hydrogen and carbon monoxide.

Example 6—A denatured alcohol was prepared by adding three parts of oxidized 108 to 130° C. alcohols to 100 parts of 95% ethyl alcohol. The 108 to 130° C. alcohols were obtained in the high pressure synthesis of methanol from hydrogen and carbon monoxide.

Example 7—A denatured alcohol was prepared by adding three parts of oxidized 160° to 200° C. alcohols to 100 parts of 95% ethyl alcohol. The 160° to 200° C. alcohols were obtained in the high pressure synthesis of methanol from hydrogen and carbon monoxide.

All of the denaturants of the above examples were tested by the following "bootleg clean-up" procedures. A mixture of 100 parts 95% ethyl alcohol denatured as above described was distilled using a 15 theoretical placed column. The distillate was diluted to 80 proof, treated with activated carbon, and filtered. The resulting alcohol solution had a pronounced odor of the denaturant and a strong unpotable taste which persisted in the mouth after tasting the solution.

The following clean-up procedure was also employed. 100 parts of denatured alcohol prepared as above described was admixed with 300 parts of ¾ saturated salt solution, shaken two minutes with 25 parts by volume of mineral oil, and allowed to stand one hour. The mineral oil layer was separated and the process repeated with a fresh 25 parts by weight portion of mineral oil. The alcoholic brine from the second extraction was shaken for thirty minutes with five parts by volume of activated charcoal. The mixture was filtered and the filtrate was shaken another half hour with a second five parts of activated carbon. The filtrate from the second activated carbon treatment was distilled using a column of approximately 15 theoretical plates. Eight cuts of distillate were collected. The cuts were diluted with tap water to 50 proof and tested for odor and taste. Each of the cuts had the odor and taste of the denaturant and were considered to be unpotable. The "head cuts" were more disagreeable in taste and odor than the "tail cuts."

Although certain proportions and quantities of denaturant and ethyl alcohol have been described, if desired the denaturant may be used along with other denaturants such as the organic nitrogen bases, methanol, acetone, kerosene, petroleum, terpenic bodies, halogenated organic derivatives, such as chlorinated phenols and the like.

The "fore shots" which can be added to produce an additional effective denaturant, may be refined if desired wholly or partially by a caustic alkali treatment, such as by distilling from a one-tenth percent caustic soda solution.

Instead of employing the full oxidation product resulting from the oxidation of higher aliphatic alcohols as hereinbefore described, various fractions thereof such as the fractions boiling from 108 to 130° C. may be employed.

Various changes may be made in the detailed practice of the invention without departing from the spirit and scope thereof, since many apparently widely differing embodiment of the invention will be apparent to one skilled in the art.

What is claimed is:

1. A denatured alcohol containing as an essential denaturant, a denaturing quantity of a mixture of aldehydes prepared by oxidizing a mixture of higher alcohols obtained in the high pressure synthesis of methanol from hydrogen and oxides of carbon.

2. A denatured alcohol containing as an essential denaturant, a denaturing quantity of an oxidation product prepared by oxidizing a mixture of aliphatic branched chain higher alcohols boiling within the range 108° C. to 200° C., and obtained in the high pressure synthesis of methanol from hydrogen and oxides of carbon, said oxidation product containing at least five percent by weight aldehydes.

3. A denatured alcohol containing as an essential denaturant, from 0.1 to 10.0% by volume of an oxidation product prepared by oxidizing a mixture of aliphatic branched chain higher alcohols boiling within the range 108° C. to 200° C., and obtained in the high pressure synthesis of methanol from hydrogen and oxides of carbon, said oxidation product containing at least 5% by weight aldehydes.

4. A denatured alcohol containing as an essential denaturant, from 0.5 to 5.0% by volume of an oxidation product prepared by oxidizing a mixture of aliphatic branched chain higher alcohols boiling within the range 108° C. to 200° C., and obtained in the high pressure synthesis of methanol from hydrogen and oxides of carbon, said oxidation product containing at least 5% by weight aldehydes.

5. A denatured alcohol containing as an essential denaturant, from 0.5 to 5.0% by volume of an oxidation product prepared by oxidizing a mixture of aliphatic branched chain higher alcohols boiling within the range 135° C. to 165° C. and obtained in the high pressure synthesis of methanol from hydrogen and oxides of carbon, said oxidation product containing at least 5% by weight aldehydes.

6. A denatured alcohol containing as an essential denaturant, from 0.1 to 10.0% by volume of an aldehyde selected from the group consisting of 2-methyl pentanal and 2,4-dimethyl pentanal.

7. A denatured ethyl alcohol containing as an essential denaturing agent from 0.1 to 10.0% by volume of 2-methyl pentanal.

8. A denatured ethyl alcohol containing as an essential denaturing agent from 0.1 to 10.0% by volume of 2,4-dimenthyl pentanal.

9. A denatured ethyl alcohol containing as an essential denaturing agent from 0.5 to 5.0% by volume of 2-methyl pentanal.

10. A denatured ethyl alcohol containing as an essential denaturing agent from 0.5 to 5.0% by volume of 2,4-dimethyl pentanal.

11. The denatured alcohol of claim 2 which contains as a cooperating denaturing agent, a mixture of dehydration and dehydrogenation products comprising ketones and hydrocarbons boiling within the range 70 to 160° C. and produced in the catalystic high pressure synthesis of methanol and higher alcohols from hydrogen and oxides of carbon.

HAMLINE M. KVALNES.

---

CERTIFICATE OF CORRECTION.

Patent No. 2,331,032.     October 5, 1943.

HAMLINE MONROE KVALNES.

It is hereby certified that error appears in the printed specification of the above numbered patent requiring correction as follows: Page 2, second column, line 56, for "embodiment" read --embodiments--; page 3, second column, line 10, claim 8, for "2,4-dimenthyl" read --2,4-dimethyl--; line 22, claim 11, for "catalystic" read --catalytic--; and that the said Letters Patent should be read with this correction therein that the same may conform to the record of the case in the Patent Office.

Signed and sealed this 30th day of November, A. D. 1943.

Henry Van Arsdale,
Acting Commissioner of Patents.

(Seal)

CERTIFICATE OF CORRECTION.

Patent No. 2,331,032.                                   October 5, 1943.

HAMLINE MONROE KVALNES.

It is hereby certified that error appears in the printed specification of the above numbered patent requiring correction as follows: Page 2, second column, line 56, for "embodiment" read --embodiments--; page 3, second column, line 10, claim 8, for "2,4-dimenthyl" read --2,4-dimethyl--; line 22, claim 11, for "catalystic" read --catalytic--; and that the said Letters Patent should be read with this correction therein that the same may conform to the record of the case in the Patent Office.

Signed and sealed this 30th day of November, A. D. 1943.

Henry Van Arsdale,
Acting Commissioner of Patents.

(Seal)